United States Patent
Arrasvuori

(10) Patent No.: US 8,335,990 B2
(45) Date of Patent: Dec. 18, 2012

(54) METHOD AND APPARATUS FOR GROUPING POINTS-OF-INTEREST ON A MAP

(75) Inventor: Juha Arrasvuori, Tampere (FI)

(73) Assignee: Nokia Corporation, Espoo (FI)

( * ) Notice: Subject to any disclaimer, the term of this patent is extended or adjusted under 35 U.S.C. 154(b) by 544 days.

(21) Appl. No.: 12/543,341

(22) Filed: Aug. 18, 2009

(65) Prior Publication Data

US 2011/0047509 A1 Feb. 24, 2011

(51) Int. Cl.
G06F 3/048 (2006.01)
G06F 17/30 (2006.01)

(52) U.S. Cl. ........ 715/765; 715/864; 715/835; 345/169; 707/737; 707/805

(58) Field of Classification Search ............... 715/733, 715/764, 765, 810, 835, 846, 864; 345/169; 707/705, 706, 723, 736, 737, 752, 805; 709/203
See application file for complete search history.

(56) References Cited

U.S. PATENT DOCUMENTS

| | | | |
|---|---|---|---|
| 7,076,741 B2 | 7/2006 | Miyaki | |
| 7,272,489 B2 | 9/2007 | Tu | |
| 7,933,897 B2 * | 4/2011 | Jones et al. | 707/723 |
| 8,060,510 B2 * | 11/2011 | Ghanekar et al. | 707/736 |
| 2005/0177303 A1 | 8/2005 | Han | |
| 2008/0250337 A1 | 10/2008 | Lemmela et al. | |
| 2009/0110302 A1 | 4/2009 | Snow | |
| 2009/0113296 A1 * | 4/2009 | Lacy et al. | 715/700 |
| 2009/0169060 A1 | 7/2009 | Faenger et al. | |
| 2009/0198767 A1 | 8/2009 | Jakobson et al. | |
| 2010/0131186 A1 * | 5/2010 | Geelen et al. | 701/200 |
| 2010/0191614 A1 * | 7/2010 | Tanskanen et al. | 705/26 |

OTHER PUBLICATIONS

Client Side Clustering, msdn, Microsoft Corporation 2009, pp. 1-11, http://msdn.microsoft.com/en-us/library/cc161072.aspx.
Kebeck, J.: How many points can you add to virtual earth. Windows Live Blog, http://johanneskebeck.spaces.live.com/blog/cns!42E1F70205EC8A96!3835.entry, Nov. 2, 2009.
Masutani, O., Iwasaki, H.: Beira: A Geo-semantic Clustering Method for Area Summary (Abstract). Lecture Notes in Computer Science, vol. 4831/2007, SpringerLink, Dated: Nov. 7, 2007, pp. 111-122, http://www.springerlink.com/content/88153233k5081q10/.
Masutani, O., Iwasaki, H.: Beira: A geo-semantic clustering method for area summary, Denso IT Laboratory, Inc. Web Information Systems Engineering (WISE) 2007, http://www.d-itlab.co.jp/wp-content/uploads/2008/07/masutani_wise2007.pdf.
De Matos, P., Alfonso, A., Carmo, M.: Geo-referenced Information Visualization on Mobile Devices. pp. 1-4, http://xldb.fc.ul.pt/xldb/publications/WSMU07.pdf.

* cited by examiner

*Primary Examiner* — Xiomar L Bautista
(74) *Attorney, Agent, or Firm* — Ditthavong Mori & Steiner, P.C.

(57) ABSTRACT

An approach is provided for grouping points-of-interest on a map. Information is aggregated about a plurality of points-of-interest. The plurality of points-of-interest are categorized into a first level grouping based on a first criterion and the aggregated information. The plurality of points-of-interest are categorized into a second level grouping based on a second criterion that is less restrictive than the first criterion and the aggregated information. The first level grouping is assigned to a first scale level of a map. The second level grouping is assigned to a second scale level of the map.

20 Claims, 9 Drawing Sheets

METHOD AND APPARATUS FOR GROUPING POINTS-OF-INTEREST ON A MAP

BACKGROUND

Wireless service providers and device manufacturers are continually challenged to deliver value and convenience to consumers by, for example, providing compelling network services. An important differentiator in this industry relates to displaying maps on a user interface, particularly in a mobile or portable environment where the display sizes can be constraining (e.g., in a cellular phone, small portable navigational units, etc.). More specifically, service providers and device manufacturers face the challenge of displaying maps and related information (e.g., points-of-interest) in a way that is useful and informative to the user. This challenge becomes increasingly more difficult as the display size available for presenting such maps decreases. Therefore, there is need for a scalable approach to organizing or grouping mapping information for presentation on a display.

SOME EXAMPLE EMBODIMENTS

According to one embodiment, a method comprises aggregating information about a plurality of points-of-interest. The method further comprises categorizing the plurality of points-of-interest into a first level grouping based on a first criterion and the aggregated information. The method also comprises categorizing the plurality of points-of-interest into a second level grouping based on a second criterion that is less restrictive than the first criterion and the aggregated information. The method further comprises assigning the first level grouping to a first scale level of a map. The method additionally comprises assigning the second level grouping to a second scale level of the map.

According to another embodiment, an apparatus comprising at least one processor, and at least one memory including computer program code, the at least one memory and the computer program code configured to, with the at least one processor, cause the apparatus to aggregate information about a plurality of points-of-interest. The apparatus is further caused to categorize the plurality of points-of-interest into a first level grouping based on a first criterion and the aggregated information. The apparatus is also caused to categorize the plurality of points-of-interest into a second level grouping based on a second criterion that is less restrictive than the first criterion and the aggregated information. The apparatus is further caused to assign the first level grouping to a first scale level of a map. The apparatus is additionally caused to assign the second level grouping to a second scale level of the map.

According to another embodiment, a computer-readable storage medium carrying one or more sequences of one or more instructions which, when executed by one or more processors, cause an apparatus to aggregate information about a plurality of points-of-interest. The apparatus is further caused to categorize the plurality of points-of-interest into a first level grouping based on a first criterion and the aggregated information. The apparatus is also caused to categorize the plurality of points-of-interest into a second level grouping based on a second criterion that is less restrictive than the first criterion and the aggregated information. The apparatus is further caused to assign the first level grouping to a first scale level of a map. The apparatus is additionally caused to assign the second level grouping to a second scale level of the map.

According to another embodiment, an apparatus comprises means for aggregating information about a plurality of points-of-interest. The apparatus further comprises means for categorizing the plurality of points-of-interest into a first level grouping based on a first criterion and the aggregated information. The apparatus also comprises means for categorizing the plurality of points-of-interest into a second level grouping based on a second criterion that is less restrictive than the first criterion and the aggregated information. The apparatus further comprises means for assigning the first level grouping to a first scale level of a map. The apparatus additionally comprises means for assigning the second level grouping to a second scale level of the map.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

A method, apparatus, and software for presenting hierarchically and categorically grouped points-of-interest are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
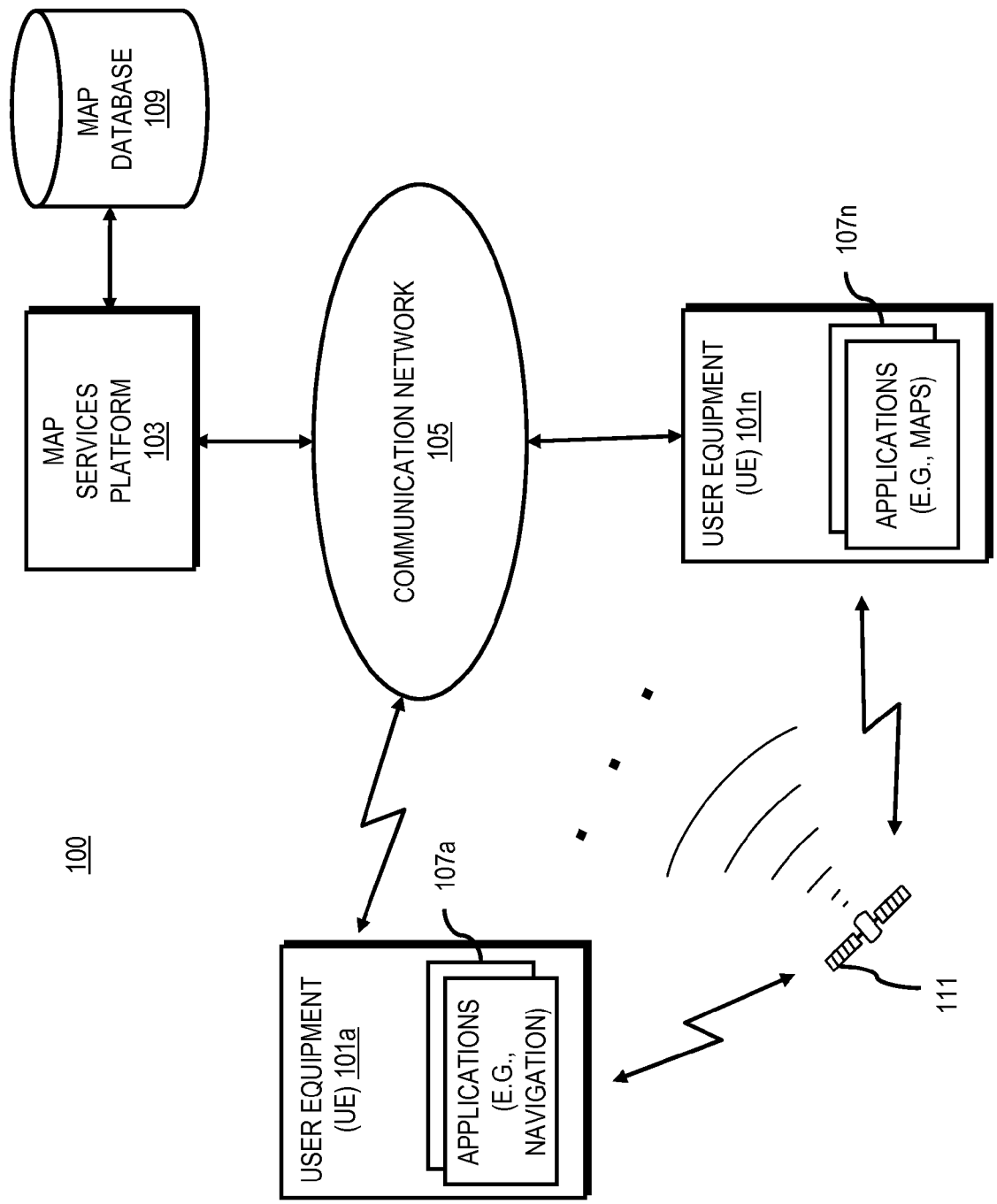
FIG. 1 is a diagram of a system capable of grouping points-of-interest including user equipment capable of displaying grouped points-of-interest, according to one embodiment.

FIG. 1 is a diagram of a system capable of grouping points-of-interest (POIs) including user equipment (UE) 101 capable of displaying grouped POIs, according to one embodiment. A POI can be a specific point location that a person may, for instance, find interesting or useful. Examples of points-of-interest can include an airport, a bakery, a dam, a landmark, a restaurant, a hotel, or any point interesting, useful, or significant in some way. Mapping and navigational services have gained ubiquitous adoption by users, but conventional interfaces can be rather burdensome to display POIs on a map area. Such interfaces can be cumbersome and can lack display functionality when a user is viewing a map with many POIs. For example, when a user views a set of POIs on a device with a limited size screen, the POIs may intermix or become crowded, thus obscuring a user's view. In such an event, a user may want to organize or group these POIs using an intuitive manner that the interface lacks.

To address this problem, a system 100 of FIG. 1 introduces the capability of aggregating information associated with POIs in order to create hierarchical groupings of the POIs based on various categories. The system 100 can then display the most appropriate grouping level on a map display depending on, for instance, the selected map scale and/or available display area. As shown, the system 100 includes user equipment 101 capable of displaying grouped POIs. By way of example, POIs can be grouped hierarchically in categories with levels of detail varying from detailed to general. Individual POIs may have the most detailed description, while each hierarchical level of grouping can have a more general description based on an aggregation of descriptive data (e.g., metadata) associated with the individual POIs. In one embodiment, the process for aggregating the descriptive data includes retrieving a detailed description of a POI or a lower hierarchical level and combining the data into more generic categories. These categories or grouping levels may be defined in the information aggregated from the detailed descriptions associated with the POIs. In addition or alternatively, the system 100 may dynamically determine the appropriate grouping levels from an analysis (e.g., a semantic analysis) of the descriptive information (e.g., name, location, description, etc.) associated with the POIs.

An example of a three-level categorical hierarchy can include an individual POI (e.g., Speedy Pizza) that is part of a POI family (e.g., Fast Food) that is further part of a POI class (e.g., Food and Drink). Thus the categories for this example would be POI, a family, and a class. Each category can include its own level of POIs (e.g., individual POIs, family-level POIs, and class-level POIs). Categorical POIs may encompass an area of the map. Each individual POI may carry detailed properties such as descriptions of which features and services the POI offers (e.g., a museum may offer a cafe, restrooms, tourist information, automatic teller machines, and souvenir shop services). In one embodiment, at one zoom level, each of the individual POIs is displayed on a map area via icons or text. Details regarding a features and/or services of the POI can be incorporated into icons or texts that represent the each of the POIs.

Additionally, when a user zooms out to a second zoom level, the detail level of the map area may no longer be able to adequately display each of the individual POIs. In other words, the zoomed out map area displays a larger physical area that potentially encompasses a larger number of POIs of interest that are displayed on the fixed display size of the user's device. As a result, representations of the POIs (e.g., icons or text) may overlap on the display and decrease map legibility. Under this scenario, the system 100 groups the POIs into families based on criteria to, for instance, reduce the number of POI representations that are displayed at any one time. The grouping of POIs enables the system 100 to display specific categories of POIs at their respective locations on the map display while reducing overall clutter on the display. By way of example, each family-level POI (e.g., a higher level or more generic category of POIs) inherits some or all of the properties of the individual POIs that the family-level POI encompasses. As the user directs the system to a second zoom, the family-level POIs are displayed in the map area of the selected map scale. When a user hovers, points, or clicks on a family-level POI, the properties of or detailed description associated with the POI can be displayed. Additionally, the user can zoom out to a third zoom level where the detail level of the map area may not be able to adequately display each of the family-level POIs. Under this scenario, class-level POIs can be displayed instead of family-level POIs. As with the previous zoom level, the class-level POIs can inherit some or all of the properties of the family-level POIs that belong to the class. Then, class-level POIs are displayed in the map area of the third zoom level and the class-level POIs may display the properties of the family-level and individual POIs. When a user zooms out to another map area, the system can display another hierarchical categorical-level of POIs. It is contemplated that the user can select any zoom level for display of a corresponding category level of POIs. If a user zooms in, the grouped POIs can be ungrouped depending on the map area, detail level, available display area, etc.

Under the scenario of FIG. 1, the system 100 involves UEs 101a-101n having connectivity to a map services platform 103 via a communication network 105. The UE 101 can utilize a navigation application 107a or a map application 107n to display map and POI information to a user. The UE 101 can retrieve maps and POI information from a map database 109 of the map services platform 103 via the communication network 105. The navigation application 107a and map application 107n may utilize global positioning system (GPS) satellites 111 to determine the location of the UE 101. The applications 107 may use this information in routing paths from the current location of the UE 101 to a POI.

In one embodiment, the POIs are grouped and hierarchically categorized at the UE 101 via a navigation application 107a or a maps application 107n. The UE 101 application 107 may have preset criteria to categorize POIs based on metadata associated with each POI. Additionally, the application 107 can hierarchically categorize the POIs using the metadata and a set of rules. The set of rules can include criteria to combine certain POIs based on metadata (e.g., a food and drink category can include POIs that have a fast food, Chinese food, dine in, or restaurant metadata). Then, the application 107 may assign the grouping to a scale level. The scale level can be based on a zoom level or set of zoom levels as well as on the display size of the UE 101.

In another embodiment, the POIs are grouped and hierarchically categorized at the map services platform 103. A grouping module (not shown) of the map services platform 103 can receive a request for POI groupings from an application 107 of a UE 101 that is preparing to display a map. The application 107 can request that the map services platform 103 send the application 107 a set of hierarchically organized POIs associated with a map area selected by the application 107. The grouping module can query a map database 109 to retrieve POI information of the map area the application 107 is requesting information about. The grouping module can then hierarchically categorize the POIs based on metadata and a set of criteria. As discussed previously, the grouping module may also dynamically categorize the POIs by performing a semantic analysis. For example, the module can analyze the name of a POI (e.g., "Flower Depot") to determine appropriate higher level grouping for the POI (e.g., Florist). In this example, the grouping module extracts the terms "flower" and "depot" from the name of the POI for comparison against, for instance, a database of semantic information to interpret that the POI is likely a floral shop and can be grouped with other florists. Next, a scaling module (not shown) of the map services platform 103 can determine which level of grouping should be sent to the application 107. The scaling module can receive a map area size (e.g., a pixel size such as 320×200) and base which grouping to provide the application 107 on the map area size. The map services platform 103 can then transmit the set of POIs grouped hierarchically to the requesting application 107. The UE 101 of the requesting application 107 can then display the map and corresponding POIs or groups of POIs.

As shown in FIG. 1, the system 100 comprises a UE 101 having connectivity to a map services platform 103 via a communication network 105. By way of example, the communication network 105 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), or any other suitable packet-switched network, such as a commercially owned, proprietary packet-switched network, e.g., a proprietary cable or fiber-optic network. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, mobile ad-hoc network (MANET), and the like.

The UE 101 is any type of mobile terminal, fixed terminal, or portable terminal including a mobile handset, station, unit, device, portable navigation device, multimedia tablet, Internet node, communicator, desktop computer, laptop computer, Personal Digital Assistants (PDAs), or any combination thereof. It is also contemplated that the UE 101 can support any type of interface to the user (such as "wearable" circuitry, etc.).

By way of example, the UE 101, and map services platform 103 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application headers (layer 5, layer 6 and layer 7) as defined by the OSI Reference Model.

Figure 2:
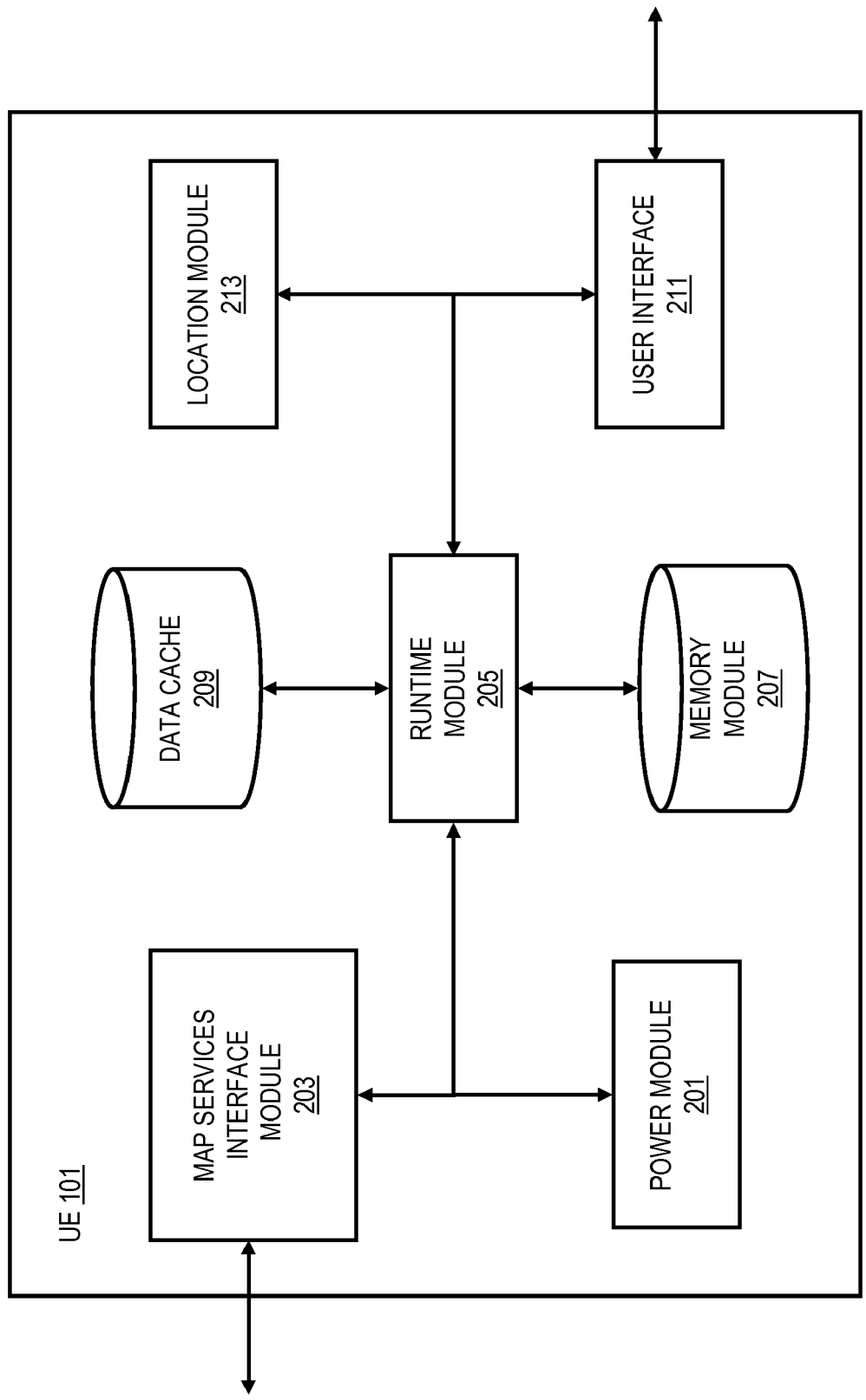
FIG. 2 is a diagram of the components of a user equipment capable of displaying hierarchically grouped points-of-interest, according to one embodiment.

FIG. 2 is a diagram of the components of a UE 101 capable of displaying hierarchically grouped points-of-interest, according to one embodiment. By way of example, the UE 101 includes one or more components capable of aggregating information related to POIs for displaying hierarchically grouped POIs. It is contemplated that the functions of these components may be combined in one or more components or performed by other components of equivalent functionality. In this embodiment, the UE 101 includes a power module 201, a map services interface module 203, a runtime module 205, a memory module 207, a data cache 209, a user interface 211, and a location module 213.

In one embodiment, the runtime module 205 executes a navigation application 107*a* or a mapping application 107*n* that is used to aggregate POI information, to hierarchically group the POIs based on the aggregated information and optionally user-specified criteria, and to choose POIs or grouping of POIs to display on a map presented on a user interface 211. The application 107 as executed by the runtime module 205 interacts with the map services platform 103 via the map services interface module 203. In some examples, the application 107 can use the map services interface module 203 to retrieve mapping content and POI data. For example, the application 107 can send a request to the map services platform 103 to retrieve current POI data and map data from a map database 109 of the map services platform 103. The map services platform 103 can query the map database 109 for the data and send the data to the map services interface module 203 via the communication network 105.

In this example, the application 107 uses the data retrieved from the map services platform 103 to group the POIs based on metadata associated with each POI. The metadata includes, for instance, additional details or information regarding the POI such as available services, features, or other descriptive elements. The application 107 can use the metadata to aggregate information about the POIs for presentation onto the map. More specifically, the application 107 can compare the metadata against a set of rules to determine hierarchical groupings. The set of rules may include rules to combine POIs based on metadata details (e.g., if a dine-in metadata detail is defined, the POI belongs to a restaurants group). In certain embodiments, the application 107 can also determine a generic description of the groups of POIs based on the descriptive labels included in the metadata. In another embodiment, the application 107 may group the POIs by performing a semantic analysis of the metadata.

The application 107 then interacts with the user interface 211 to receive a scale level input, determine a display scale level corresponding to the input, and initiate display of the groupings based on the determined display scale level. In one embodiment, the determined display scale level is determined based at least in part on the display size available on the UE 101. In other embodiments, the groupings can be assigned a display scale level based on the size of a user interface 211 display using another set of rules (e.g., a grouping is selected based on a POIs to available pixel ration). The application 107 can then cause the user interface 211 to display the set of POIs on the map by generating icons encompassing the POIs of a first level or grouping and additional icons for each subsequent level of POI grouping. It is also contemplated that the user interface 211 may use text, symbols, or other similar marker to designate a POI on the map display area.

As shown in FIG. 2, the UE 101 can include a data cache 209. The data cache 209 can be utilized to store map data, POI content, grouping levels, the hierarchy between the grouping levels, and other similar information generated by the application 107. In some instances, the map data and POI content can be primarily stored in the data cache 209. In other instances, the map data and POI content is requested from a map services platform 103 via the map services interface module 203 on a temporary basis. Under some scenarios, the map data is primarily stored in the data cache 209, but the POI content is requested from the map services platform 103. Under other scenarios, the map and POI content are primarily stored on the data cache 209 and updated periodically or by request by utilizing the map services interface module 203. Additionally, the data cache 209 is able to store icons and icon components used to generate icons for POIs and grouped POIs.

Additionally, the user interface 211 of the UE 101 can include various methods of communication. For example, the user interface 211 can include outputs including a visual component (e.g., a screen), an audio component (e.g., amplifiers and speakers), a physical component (e.g., vibrations), and other methods of communication. User inputs can include a touch-screen interface, a scroll-and-click interface, a button interface, a microphone, etc. A user can input a request to use a map application 107n or a navigation application 107a to retrieve map and POI content for presentation via the visual component. Additionally, the user can input requests to zoom in or zoom out of a map area of the application 107. The visual component can zoom in and out of the map area correspondingly.

In one embodiment, the UE 101 includes a location module 213. This location module 213 can determine a location of the user's UE 101. The user's location can be determined by a triangulation system such as a GPS, Assisted GPS (A-GPS), Cell of Origin, or other location extrapolation technologies. Standard GPS and A-GPS systems can use GPS satellites 111 to pinpoint the location of a UE 101. A Cell of Origin system can be used to determine the cellular tower that a cellular UE 101 is synchronized with. This information provides a coarse location of the UE 101 because the cellular tower may include a unique cellular identifier (cell-ID) that can be geographically mapped. The location module 213 may also utilize multiple technologies to detect the location of the UE 101. GPS coordinates can provide finer detail as to the location of the UE 101. By way of example, the application 107 uses the location module 213 to determine the location of the UE 101. The determined location can be used for determining the context for selecting the maps and/or POIs to display via the user interface 211.

The UE 101 also includes the power module 201 to provide power to the UE 101. The power module 201 can include any type of power source (e.g., battery, plug-in, etc.). Additionally, the power module 201 can provide power to the components of the UE 101 including processors, memory, and transmitters.

Figure 3:
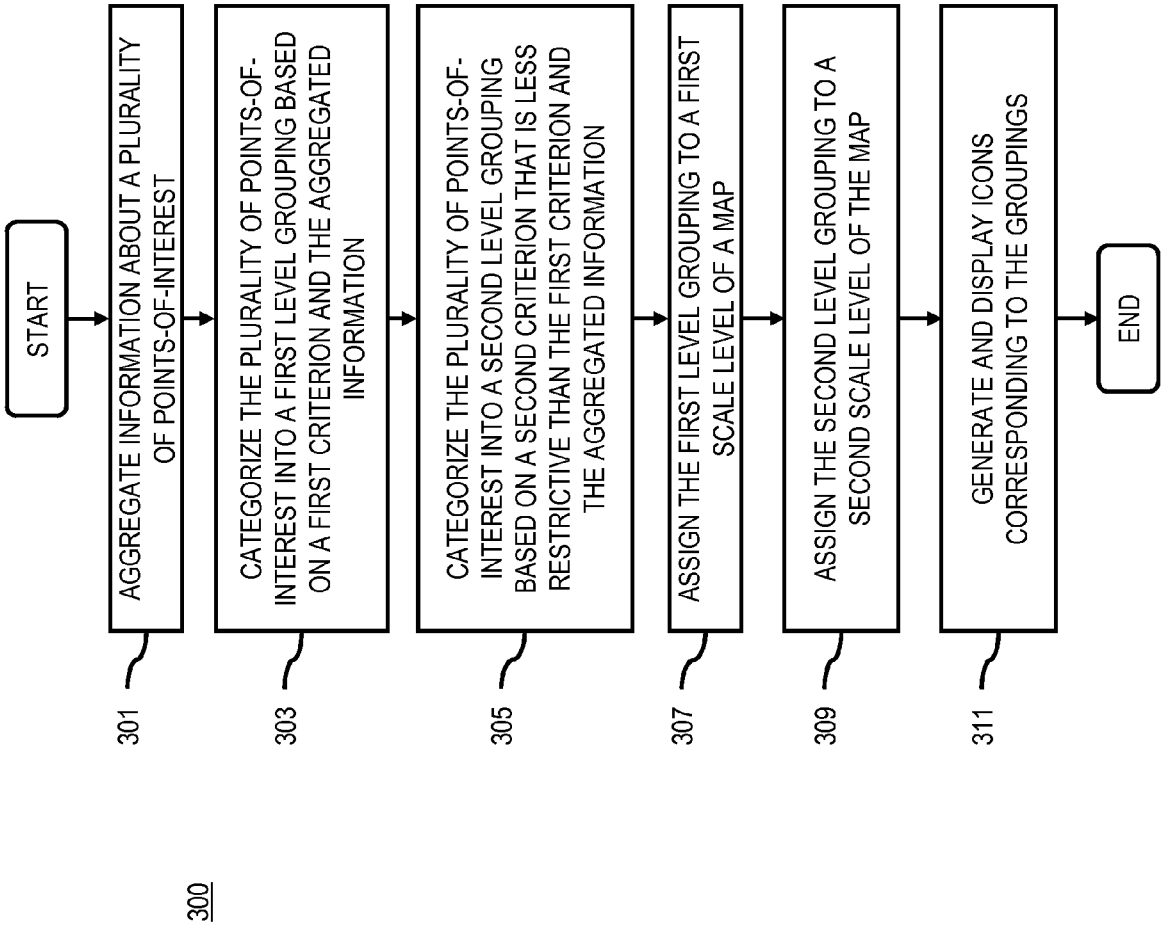
FIG. 3 is a flowchart of a process for grouping and displaying grouped points-of-interest, according to one embodiment.

FIG. 3 is a flowchart of a process for displaying hierarchically categorically grouped points-of-interest, according to one embodiment. In one embodiment, the runtime module 205 executing the application 107 performs the process 300 and is implemented in, for instance, a chip set including a processor and a memory as shown FIG. 6. A user may be inclined to view a map on the UE 101 to view POIs. In one such case, the user may be utilizing a navigation application 107a to navigate to a POI. In another such case, the user may be using a map application 107n to view information about the POIs. The POIs can have properties (e.g., descriptions of features and services available at the POI) that can be viewed on the UE 101. The UE 101 can retrieve the map and POI information from a map services platform 103 by generating a request for the information, initiating transmission of the request over a communication network 105 to the map services platform 103, and receiving the information from the map services platform 103. Additionally, the map and POI information can be stored in a data cache 209 of the UE 101. When a user zooms out of the view, additional POIs can be viewed on the screen. These additional POIs can be grouped into hierarchical categories to display the grouped POIs to the user.

At step 301, the runtime module 205 aggregates information about a plurality of points-of-interest. In one embodiment, the runtime module 205 aggregates information about the plurality of POIs by retrieving and/or parsing metadata associated with the POIs. The runtime module 205 can additionally retrieve a portion of the POI information from a map services platform 103 or can store it in a data cache 209. The POI information may include, for instance, a POI name, details about the POI, and/or other common POI information (e.g., GPS coordinates or an address).

In another embodiment, the aggregated POIs information can include common POI information, a POI name, and/or predefined groupings associated with each respective POI. When a new POI is added, an operator adding the POI may add a POI name and select each of the groupings the POI belongs to from predefined categories (e.g., each of a first level grouping, a second level grouping, and a third level grouping may be selected). The operator may also add additional predefined categories associated with the new POI. The categorical grouping information can be included in the POI metadata for each POI.

In a further embodiment, the aggregated POIs information can include common POI information, a POI name, and/or a first predefined level grouping for each POI. When a new POI is added, an operator adding the POI can define a POI name and select a first level grouping the POI belongs to from predefined categories. The first level grouping can be associated with higher-level grouping categories, thus the operator need not define these categories separately. Optionally, the operator can define additional first level grouping categories and select the next higher-level grouping category the first-level grouping belongs to. In the same manner, the operator can add higher-level grouping categories.

In yet another embodiment, the aggregated POIs information includes descriptive information associated with each POI. The runtime module 205 can then determine the link between the POI descriptive information (e.g., POI name) and one or more higher level groupings. To make this determination, the runtime module 205 performs, for instance, a semantic analysis on the POI descriptive information (e.g., POI name). In certain embodiments, the runtime module 205 may cross reference the semantic information derived from the POI information against additional information (e.g., GPS coordinates of the POI). For example, when determining a grouping level for a POI named "Red Dragon," the runtime module 205 may utilize information about what other businesses or POIs are nearby. It is more likely that the "Red Dragon" is a restaurant if there are other restaurants nearby. In addition or alternatively, the runtime module 205 query an online database (e.g., business directories, search engines, etc.) for additional information about the POI. The runtime module 205 can then incorporate the additional information into the aggregated POIs information to identify an appropriate grouping level for the POI.

At step 303, the runtime module 205 categorizes a plurality of points-of-interest into a first level grouping based on a first criterion and the aggregated information. Then at step 305, the runtime module 205 categorizes the plurality of POIs into a second level grouping based on a second criterion that is less restrictive than the first criterion and the aggregated information. Each criterion can be based on certain properties that are common among the POIs. Additionally, each criterion can be used to define categorical placements for each POI. This definition can be stored in metadata associated with a POI and then combined into the aggregated information. Multiple levels of groupings can be determined based on the defined category. Further, more than two levels of groupings can be categorized and used by the runtime module 205. Table 1, below demonstrates an exemplary three-level categorization of POIs using two levels of groupings.

TABLE 1

| Point-of-interest | First level grouping | Second level grouping |
| --- | --- | --- |
| Pizza Express | Fast Food | Food and Drink |
| Burger Express | Fast Food | Food and Drink |
| Red Dragon | Chinese Food | Food and Drink |
| Great Wall | Chinese Food | Food and Drink |
| Hanover Art Gallery | Art Gallery | Museum |
| Museum of Natural History | Historical Museum | Museum |

TABLE 2

Additionally, Table 2, below demonstrates a four-level categorization of POIs:

| Point-of-interest | First level grouping | Second level grouping | Third level grouping |
| --- | --- | --- | --- |
| Red Dragon | Chinese Food | Ethnic Food | Food and Drink |
| Haiku | Japanese Food | Ethnic Food | Food and Drink |
| Taj | Indian Food | Ethnic Food | Food and Drink |
| Burger Express | Fast Food | American Food | Food and Drink |
| Church of Christ | Orthodox Church | Church | Religious Building |
| Temple Micah | Jewish Temple | Temple | Religious Building |

In one embodiment, the POI includes the most detailed description. Each subsequently higher level of grouping (e.g., the first level grouping to the third level grouping) can have a more general description based on an aggregation of data associated with the POIs. In one embodiment, the selection of the grouping can be based on criteria, rules, and/or dynamic analysis (e.g., semantic analysis). The process for aggregating data includes, for instance, retrieving the detailed description associated with each POI and combining them into more general categories. By way of example, the aggregation or combining process may be performed dynamically by the runtime module 205, map services platform 103, applications 107, or other similar component. For example, an individual POI listing for Pizza Express may have a detailed description that includes: restroom, pizza, pasta, delivery, and $8 dinners. Further, an individual POI of Burger Express may have a detailed description that includes: restroom, cheeseburgers, hotdogs, dining room, drive-through, and $5 to $7 dinners. At the first level grouping, these POIs are grouped into a Fast Food category. The Fast Food category may have a description that includes, for example, restroom, American food, Italian food, dining room, drive-through, delivery, $5 to $8 dinners. Thus, the first level grouping description may be more general than the POI description. Further, an individual POI of Red Dragon can include a detailed description that includes: dining room, takeout, egg rolls, rice dishes, and $9 to $12 dinners. The Red Dragon POI can be combined with a Chinese Food first level grouping that can be combined with the Burger Express POI and the Pizza Express POI at a second level grouping of Food and Drink. The Food and Drink category can include a description of: restroom, Italian food, American food, Chinese food, eat-in, eat-out, and $5 to $12 dinners. The above example includes a three-level categorization, however, it is contemplated that any number of hierarchical groupings levels can be used (e.g., a four-level categorization as exemplified in Table 2). In some embodiments, the grouping levels aggregate the detailed properties of each POI, but only display a select few of the properties. A user can be provided options to select which properties to display and in which order. The POIs or groupings may be displayed on a map via icons or text.

In one embodiment, categorization information can be included in metadata or other data sets associated with each POI. The categorization information, for instance, can include a predefined categorical hierarchy for the POI. For example, a Red Dragon POI can have categorical information that defines a POI name of Red Dragon, a first level grouping of Chinese food, a second level grouping of Ethnic Food, and a third level grouping of Food and Drink. The runtime module 205 can then process this information from the aggregated information using criteria (e.g., a rule set for processing the aggregated information into useable groupings for each POI) to categorize the plurality of POIs. In another embodiment, the categorization information can include a predefined first level grouping. For example, the Red Dragon POI can have a POI name of Red Dragon and a first level grouping of Chinese food. The runtime module 205 can process this information from the aggregated information using criterion (e.g., a rule set that defines which hierarchical categories the first level grouping belongs to). For example, a rule set may define that a POI with a Chinese food first level grouping is also in a second level grouping of Ethnic Food and a third level grouping of Food and Drink. The rule set can be in the form of a data structure (e.g., a table) that defines categorization of the different POIs.

In a further embodiment, the runtime module 205 may determine the first level grouping of a POI based on a POI name (e.g., Red Dragon). As discussed previously, the runtime module 205 may perform a semantic analysis on the POI name to make the determination (e.g., Red Dragon belongs to a Chinese food first level group because a color plus the term "dragon" have a high probability of being in the Chinese food category or a Burger Express POI name belongs to the fast food category because a food type plus the term "express" have a high probability of being in the fast food category). Additionally, the runtime module 205 may also query other databases (e.g., a phone book) to determine the first level grouping. Further, the runtime module 205 may determine the first level grouping based in part on other POIs nearby (e.g., if a Red Dragon POI is surrounded by many restaurants, there is a greater probability that it is a restaurant). Once a POI has been categorized into a first level group, a hierarchy associated with the first level group and other categories can be utilized to determine higher level groupings.

Next, at step 307, the runtime module 205 can assign the first level grouping to a first scale level of a map. Additionally, at step 309, the runtime module 205 can assign the second level grouping to a second scale level of the map. For example, a scale level can correspond to a particular zoom level chosen for display on the UE 101. Moreover, the scale level can incorporate multiple zoom levels (e.g., if there are ten zoom levels and a three-level categorization, the UE 101 can assign individual POIs at zoom levels 1 through 3, first level grouping POIs at zoom levels 4 through 7, and second level grouping POIs at zoom levels 8 through 10). The runtime module 205 may determine a display scale level according to which POI grouping level is appropriate to display.

In one embodiment, a user can input a scale/zoom level into the UE 101 using a user interface 211. The runtime module 205 may determine a display scale level based on the scale level input. Additionally, the display scale level can correspond with the first scale level or the second scale level. If the display scale level corresponds with the first scale level or second scale level, the respective grouping can be chosen to be displayed on the map. The runtime module 205 may then initiate display of the POI grouping level associated with the selected display scale level. Additionally, the display scale level can be determined based on a display size as well as the scale level input. For example, an 800×352 pixel display may show more content at a given zoom level than a 208×208 pixel display. The runtime module 205 can define a number of POIs or groupings of POIs that can be comfortably displayed in a display area (e.g., by using a POI to available pixel ratio). If there are more POIs than available display space (e.g., available pixels) at a certain zoom level, the runtime module 205 may determine that another grouping level is more appropriate to display. Further, if there are more first level grouping POIs than space at a zoom level, the runtime module 205 may determine that a more general grouping is appropriate to display.

Next, at step 311, the runtime module 205 generates and displays icons corresponding to the groupings. In one embodiment, the icons can be previously prepared and stored in a data cache 209. Alternatively, icon components can be stored in the data cache 209 and be used to dynamically generate an icon to display. In one embodiment, the runtime module 205 generates a first icon that encompasses the POIs of the first level grouping. Additionally, the runtime module 205 generates a second icon encompassing the POIs of the second level grouping as well as icons for any subsequent grouping level. The icons can encompass the POIs of each respective level grouping by creating a polygon that has endpoints that are the outermost POIs of the respective level grouping. The runtime module 205 can then initiate display of either the first icon, second icon, or other icons based on the determined display scale level. The first icon is displayed if the display scale level corresponds to the first scale level grouping and the second icon is displayed if the display scale level corresponds to the second scale level grouping. POI icons can be displayed if the display scale corresponds to a POI level. The user can activate an icon to display properties associated with the POIs and groupings of POIs. Moreover, the user can activate the icon by clicking on the icon or hovering over the icon with e.g., a mouse pointer.

With the above approach, users are able to more intuitively utilize a map display by grouping POIs based on hierarchical categories. In this manner, the user can view information about POIs as grouped hierarchical categories and thus can view properties of many POIs as a group. This is advantageous because a UE 101 of the user need not download each individual POI if a grouping is used, thus saving bandwidth and memory storage costs. Using this intuitive approach, the user may be able to decide which area of a city the user wishes to visit based on a quick look at POI groupings for the city.

Figure 4A:
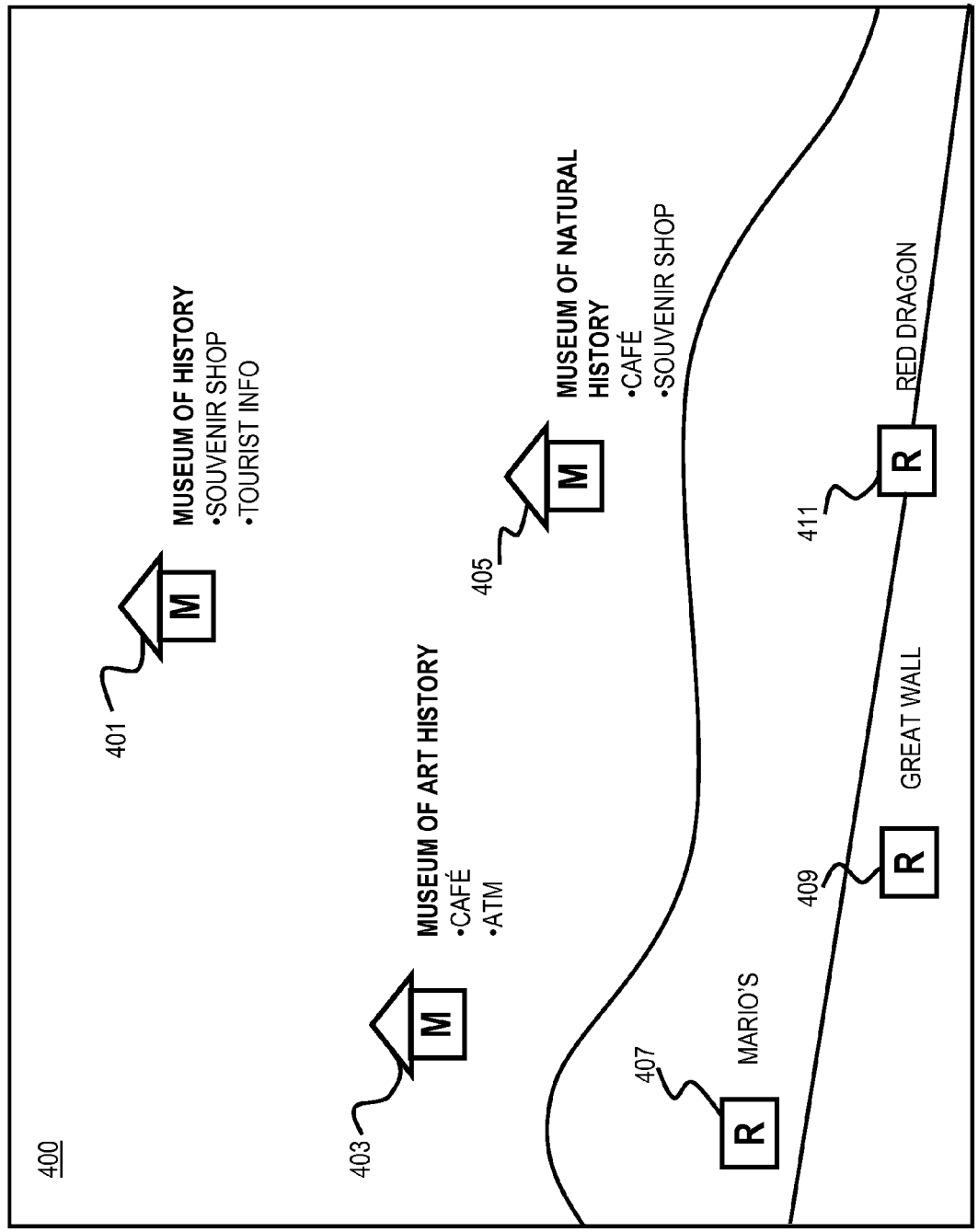
FIGS. 4A-4C are diagrams of user interfaces utilized in the processes of FIG. 3, according to various embodiments.
Figure 4B:
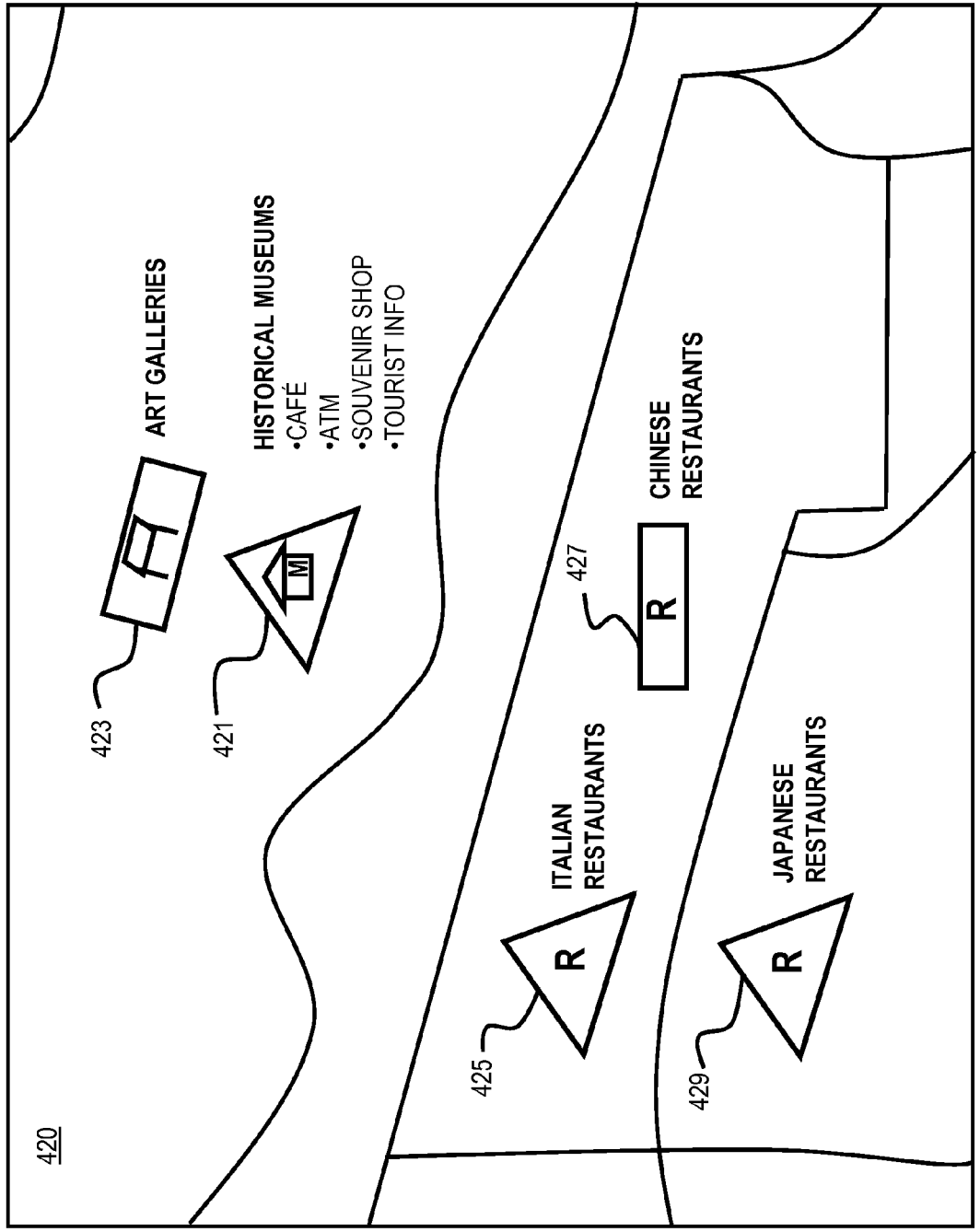
Figure 4C:
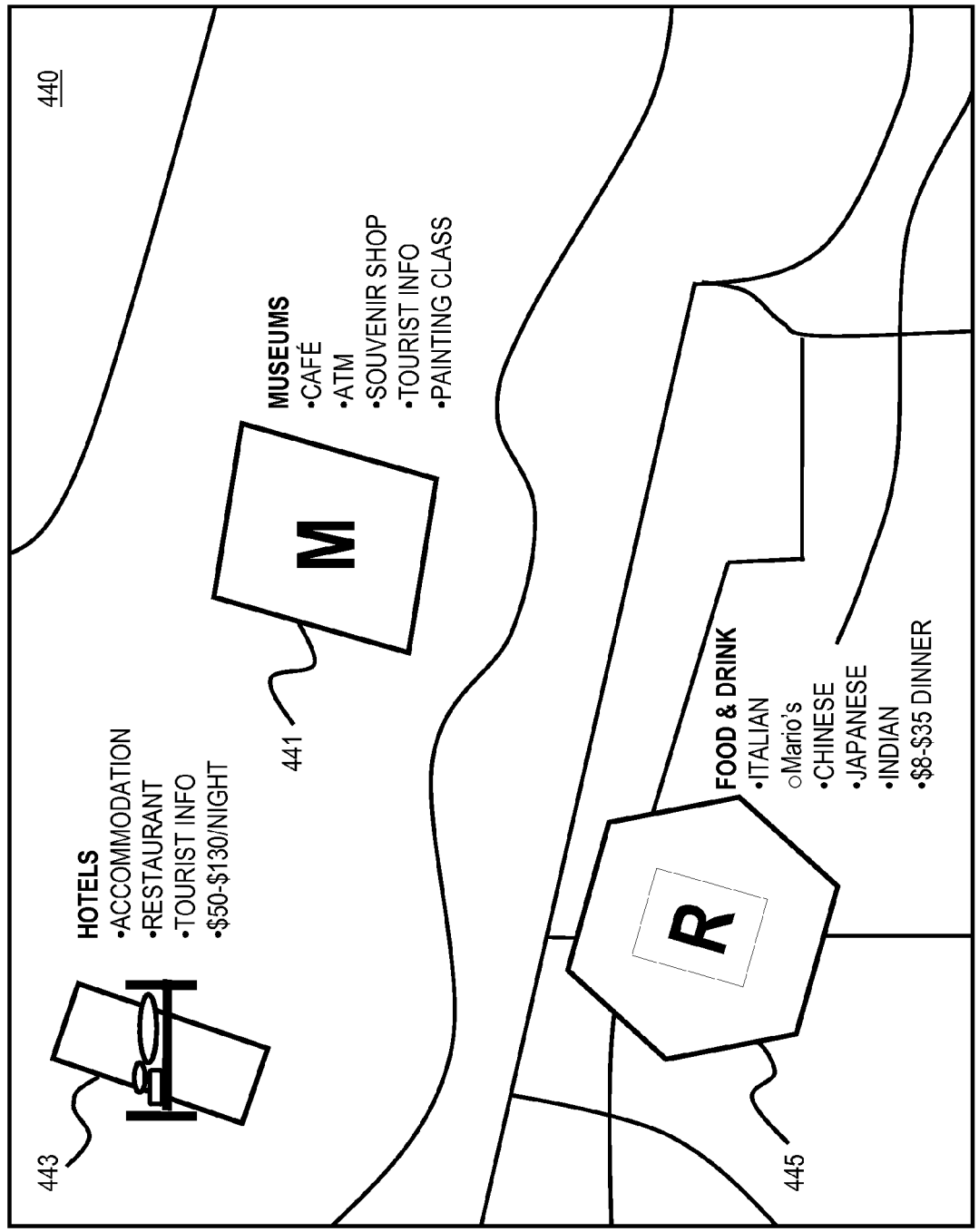

FIGS. 4A-4C are diagrams of user interfaces utilized in the processes of FIG. 3, according to various embodiments. User interface 400 of FIG. 4A displays a zoomed-in map area of a UE 101. The user interface 400 displays POIs, including a Museum of History POI 401, A Museum of Art History POI 403, a Museum of Natural History POI 405, a Mario's Restaurant POI 407, a Great Wall Restaurant POI 409, and a Red Dragon POI 411. Under the scenario of FIG. 4A, the museum POIs 401, 403, 405 are selected to display additional details. Thus, the Museum of History POI displays that it has a souvenir shop and tourist information. Additionally, the Museum of Art History POI 403 displays that the Museum of Art History includes a café and an automated teller machine (ATM), while the Museum of Natural History POI 405 displays that the Museum of Natural History includes a café and a souvenir shop.

FIG. 4B displays user interface 420 that includes a zoomed-out map area of FIG. 4A. The user interface 420 displays hierarchical, categorically grouped POIs (e.g., family-level POIs). The UE 101 has grouped the museum POIs 401, 403, 405 of FIG. 4A into a historical museum category. Thus, a historical museums POI 421 is displayed on user interface 420. Additionally, a further group of art gallery POIs is grouped into an art galleries POI 423. Furthermore, Mario's Restaurant POI 407 is grouped together with other Italian Restaurants to create an Italian restaurants POI 425 based on an Italian restaurants criterion and Great Wall Restaurant POI 409 and Red Dragon Restaurant POI 411 are grouped together to create a Chinese restaurants POI 427 based on a Chinese restaurant criterion. Moreover, a Japanese restaurants POI 429 is created from a group of POIs based on a Japanese restaurant criterion. In user interface 420, the historical museums POI 421 is selected to display its properties. The properties of the historical museums POI 421 can include aggregated detailed properties of the individual museum POIs 401, 403, 405 grouped in the historical museums POI 421 grouping.

FIG. 4C displays a user interface 440 that includes a zoomed-out map area of FIG. 4B. The user interface 440 displays groups of the POIs of FIGS. 4A and 4B based on various criteria. In this scenario, the criteria are more general. For example, the art galleries POI 423 and historical museums POI 421 are combined into a more general museums category that is displayed in a museums POI 441. This museums POI 441 can include properties of the each of the individual museums (e.g., a painting class from an art gallery or art museum).

Additionally, the user interface 440 displays a hotels POI 443 grouping. The hotels POI 443 grouping can be based on a criterion dealing with renting a room on a daily basis. Thus, the hotels POI 443 can include motels and hotels. Additionally, the hotels POI 443 can include a list of properties that can include accommodation, restaurant, tourist information, and room rates. In this example, the room rates can be displayed as a range for the combined hotel POIs. Thus, one hotel belonging to the group can have a range of $50 to $100 a night and another could have a range of $75 to $130 a night to determine the displayed price range of $50 to $130 a night.

Moreover, the user interface 440 displays a Food and Drink POI 445 grouping. The food and drink POI 445 grouping can include the POIs included in the Italian restaurants POI 425, the Chinese restaurants POI 427, and Japanese restaurants POI 429 as well as additional POIs including an Indian restaurant. Additionally, properties of a dinner entree price range can be displayed. The user of the user interface 440 is able to click on the food and drink POI 445 to view or hide the additional properties (e.g., the family of restaurants and price ranges). Thus, a user may be able to access a listing of Italian restaurants (e.g., including Mario's).

The processes described herein for presenting hierarchically categorically grouped points-of-interest may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 5:
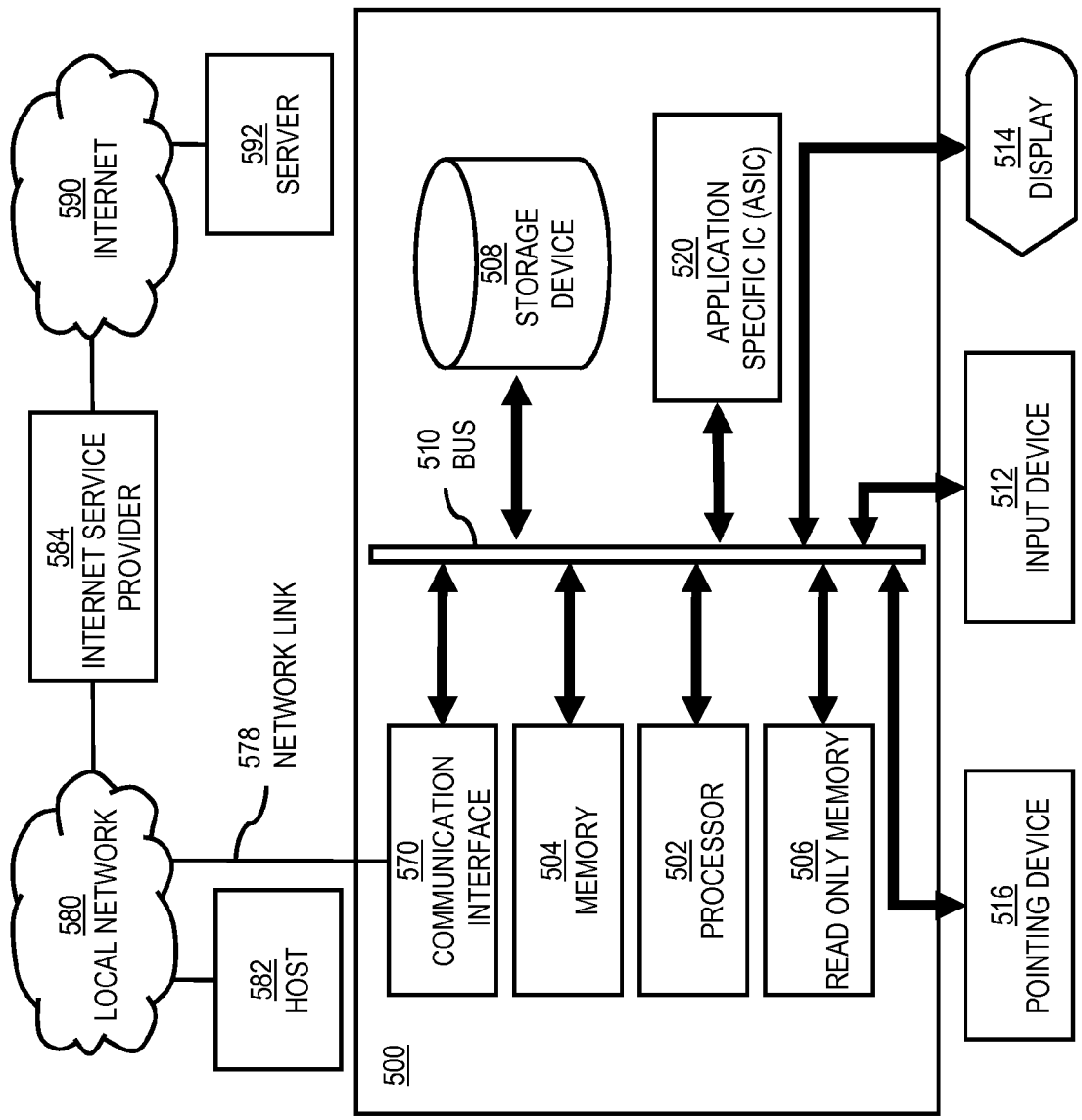
FIG. 5 is a diagram of hardware that can be used to implement an embodiment of the invention.

FIG. 5 illustrates a computer system 500 upon which an embodiment of the invention may be implemented. Computer system 500 is programmed (e.g., via computer program code or instructions) to present hierarchically categorically grouped points-of-interest as described herein and includes a communication mechanism such as a bus 510 for passing information between other internal and external components of the computer system 500. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 500, or a portion thereof, constitutes a means for performing one or more steps of presenting hierarchically categorically grouped points-of-interest.

A bus 510 includes one or more parallel conductors of information so that information is transferred quickly among devices coupled to the bus 510. One or more processors 502 for processing information are coupled with the bus 510.

A processor 502 performs a set of operations on information as specified by computer program code related to presenting hierarchically categorically grouped points-of-interest. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 510 and placing information on the bus 510. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 502, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 500 also includes a memory 504 coupled to bus 510. The memory 504, such as a random access memory (RAM) or other dynamic storage device, stores information including processor instructions for presenting hierarchically categorically grouped points-of-interest. Dynamic memory allows information stored therein to be changed by the computer system 500. RAM allows a unit of information stored at a location called a memory address to be stored and retrieved independently of information at neighboring addresses. The memory 504 is also used by the processor 502 to store temporary values during execution of processor instructions. The computer system 500 also includes a read only memory (ROM) 506 or other static storage device coupled to the bus 510 for storing static information, including instructions, that is not changed by the computer system 500. Some memory is composed of volatile storage that loses the information stored thereon when power is lost. Also coupled to bus 510 is a non-volatile (persistent) storage device 508, such as a magnetic disk, optical disk or flash card, for storing information, including instructions, that persists even when the computer system 500 is turned off or otherwise loses power.

Information, including instructions for presenting hierarchically categorically grouped points-of-interest, is provided to the bus 510 for use by the processor from an external input device 512, such as a keyboard containing alphanumeric keys operated by a human user, or a sensor. A sensor detects conditions in its vicinity and transforms those detections into physical expression compatible with the measurable phenomenon used to represent information in computer system 500. Other external devices coupled to bus 510, used primarily for interacting with humans, include a display device 514, such as a cathode ray tube (CRT) or a liquid crystal display (LCD), or plasma screen or printer for presenting text or images, and a pointing device 516, such as a mouse or a trackball or cursor direction keys, or motion sensor, for controlling a position of a small cursor image presented on the display 514 and issuing commands associated with graphical elements presented on the display 514. In some embodiments, for example, in embodiments in which the computer system 500 performs all functions automatically without human input, one or more of external input device 512, display device 514 and pointing device 516 is omitted.

In the illustrated embodiment, special purpose hardware, such as an application specific integrated circuit (ASIC) 520, is coupled to bus 510. The special purpose hardware is configured to perform operations not performed by processor 502 quickly enough for special purposes. Examples of application specific ICs include graphics accelerator cards for generating images for display 514, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 500 also includes one or more instances of a communications interface 570 coupled to bus 510. Communications interface 570 provides a one-way or two-way communication coupling to a variety of external devices that operate with their own processors, such as printers, scanners and external disks. In general the coupling is with a network link 578 that is connected to a local network 580 to which a variety of external devices with their own processors are connected. For example, communications interface 570 may be a parallel port or a serial port or a universal serial bus (USB) port on a personal computer. In some embodiments, communications interface 570 is an integrated services digital network (ISDN) card or a digital subscriber line (DSL) card or a telephone modem that provides an information communication connection to a corresponding type of telephone line. In some embodiments, a communications interface 570 is a cable modem that converts signals on bus 510 into signals for a communication connection over a coaxial cable or into optical signals for a communication connection over a fiber optic cable. As another example, communications interface 570 may be a local area network (LAN) card to provide a data communication connection to a compatible LAN, such as Ethernet. Wireless links may also be implemented. For wireless links, the communications interface 570 sends or receives or both sends and receives electrical, acoustic or electromagnetic signals, including infrared and optical signals, which carry information streams, such as digital data. For example, in wireless handheld devices, such as mobile telephones like cell phones, the communications interface 570 includes a radio band electromagnetic transmitter and receiver called a radio transceiver. In certain embodiments, the communications interface 570 enables connection to the communication network 105 to the UE 101.

The term computer-readable medium is used herein to refer to any medium that participates in providing information to processor 502, including instructions for execution. Such a medium may take many forms, including, but not limited to, non-volatile media, volatile media and transmission media. Non-volatile media include, for example, optical or magnetic disks, such as storage device 508. Volatile media include, for example, dynamic memory 504. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 520.

Network link 578 typically provides information communication using transmission media through one or more networks to other devices that use or process the information. For example, network link 578 may provide a connection through local network 580 to a host computer 582 or to equipment 584 operated by an Internet Service Provider (ISP). ISP equipment 584 in turn provides data communication services through the public, world-wide packet-switching communication network of networks now commonly referred to as the Internet 590. A computer called a server host 592 connected to the Internet hosts a process that provides a service in response to information received over the Internet. For example, server host 592 hosts a process that provides information representing video data for presentation at display 514.

At least some embodiments of the invention are related to the use of computer system 500 for implementing some or all of the techniques described herein. According to one embodiment of the invention, those techniques are performed by computer system 500 in response to processor 502 executing one or more sequences of one or more processor instructions contained in memory 504. Such instructions, also called computer instructions, software and program code, may be read into memory 504 from another computer-readable medium such as storage device 508 or network link 578. Execution of the sequences of instructions contained in memory 504 causes processor 502 to perform one or more of the method steps described herein. In alternative embodiments, hardware, such as ASIC 520, may be used in place of or in combination with software to implement the invention. Thus, embodiments of the invention are not limited to any specific combination of hardware and software, unless otherwise explicitly stated herein.

The signals transmitted over network link 578 and other networks through communications interface 570, carry information to and from computer system 500. Computer system 500 can send and receive information, including program code, through the networks 580, 590 among others, through network link 578 and communications interface 570. In an example using the Internet 590, a server host 592 transmits program code for a particular application, requested by a message sent from computer 500, through Internet 590, ISP equipment 584, local network 580 and communications interface 570. The received code may be executed by processor 502 as it is received, or may be stored in memory 504 or in storage device 508 or other non-volatile storage for later execution, or both. In this manner, computer system 500 may obtain application program code in the form of signals on a carrier wave.

Various forms of computer readable media may be involved in carrying one or more sequence of instructions or data or both to processor 502 for execution. For example, instructions and data may initially be carried on a magnetic disk of a remote computer such as host 582. The remote computer loads the instructions and data into its dynamic memory and sends the instructions and data over a telephone line using a modem. A modem local to the computer system 500 receives the instructions and data on a telephone line and uses an infra-red transmitter to convert the instructions and data to a signal on an infra-red carrier wave serving as the network link 578. An infrared detector serving as communications interface 570 receives the instructions and data carried in the infrared signal and places information representing the instructions and data onto bus 510. Bus 510 carries the information to memory 504 from which processor 502 retrieves and executes the instructions using some of the data sent with the instructions. The instructions and data received in memory 504 may optionally be stored on storage device 508, either before or after execution by the processor 502.

Figure 6:
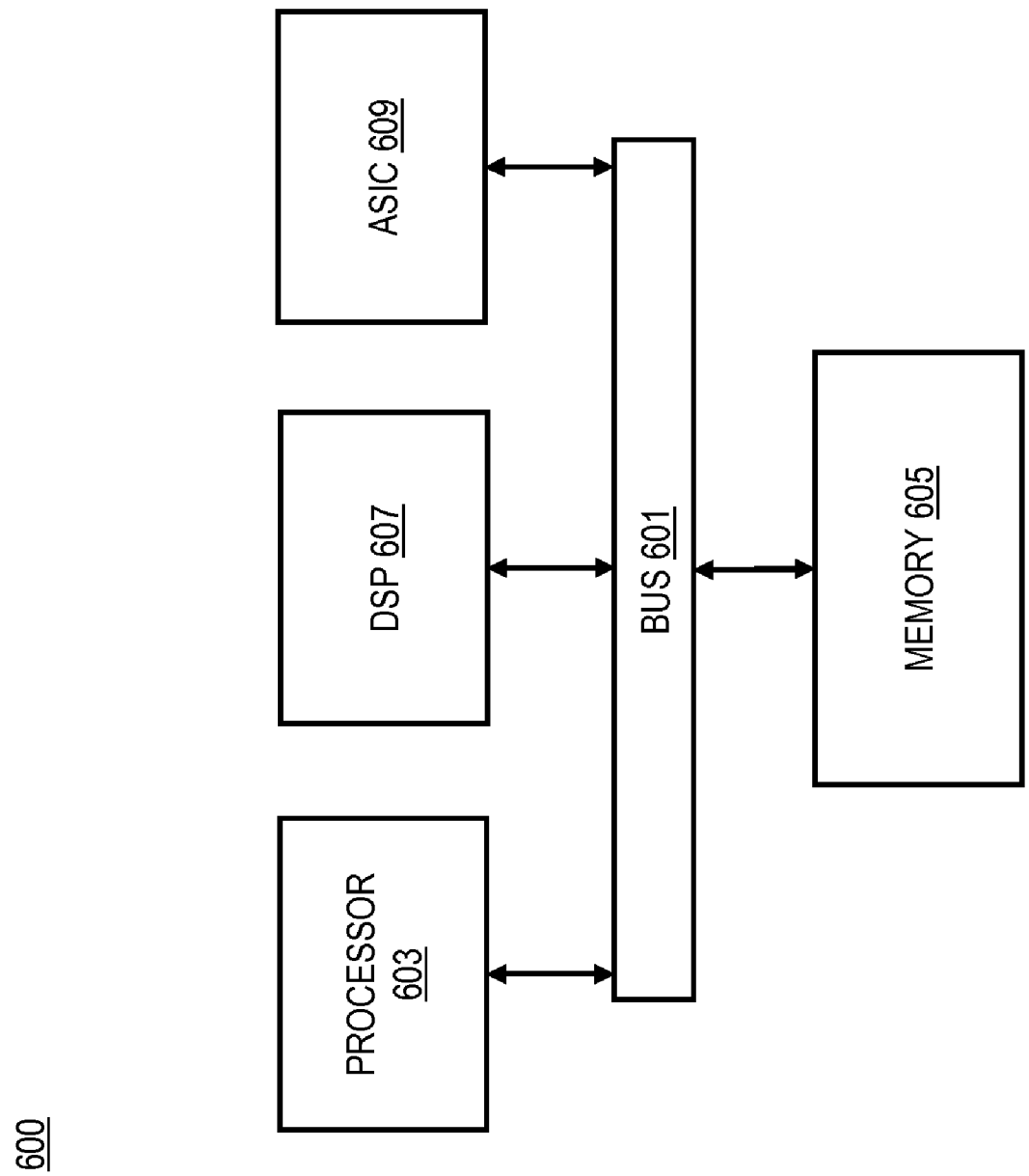
FIG. 6 is a diagram of a chip set that can be used to implement an embodiment of the invention.

FIG. 6 illustrates a chip set 600 upon which an embodiment of the invention may be implemented. Chip set 600 is programmed to present hierarchically categorically grouped points-of-interest as described herein and includes, for instance, the processor and memory components described with respect to FIG. 5 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 600, or a portion thereof, constitutes a means for performing one or more steps of presenting hierarchically categorically grouped points-of-interest.

In one embodiment, the chip set 600 includes a communication mechanism such as a bus 601 for passing information among the components of the chip set 600. A processor 603 has connectivity to the bus 601 to execute instructions and process information stored in, for example, a memory 605. The processor 603 may include one or more processing cores with each core configured to perform independently. A multi-core processor enables multiprocessing within a single physical package. Examples of a multi-core processor include two, four, eight, or greater numbers of processing cores. Alternatively or in addition, the processor 603 may include one or more microprocessors configured in tandem via the bus 601 to enable independent execution of instructions, pipelining, and multithreading. The processor 603 may also be accompanied with one or more specialized components to perform certain processing functions and tasks such as one or more digital signal processors (DSP) 607, or one or more application-specific integrated circuits (ASIC) 609. A DSP 607 typically is configured to process real-world signals (e.g., sound) in real time independently of the processor 603. Similarly, an ASIC 609 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 603 and accompanying components have connectivity to the memory 605 via the bus 601. The memory 605 includes both dynamic memory (e.g., RAM, magnetic disk, writable optical disk, etc.) and static memory (e.g., ROM, CD-ROM, etc.) for storing executable instructions that when executed perform the inventive steps described herein to present hierarchically categorically grouped points-of-interest. The memory 605 also stores the data associated with or generated by the execution of the inventive steps.

Figure 7:
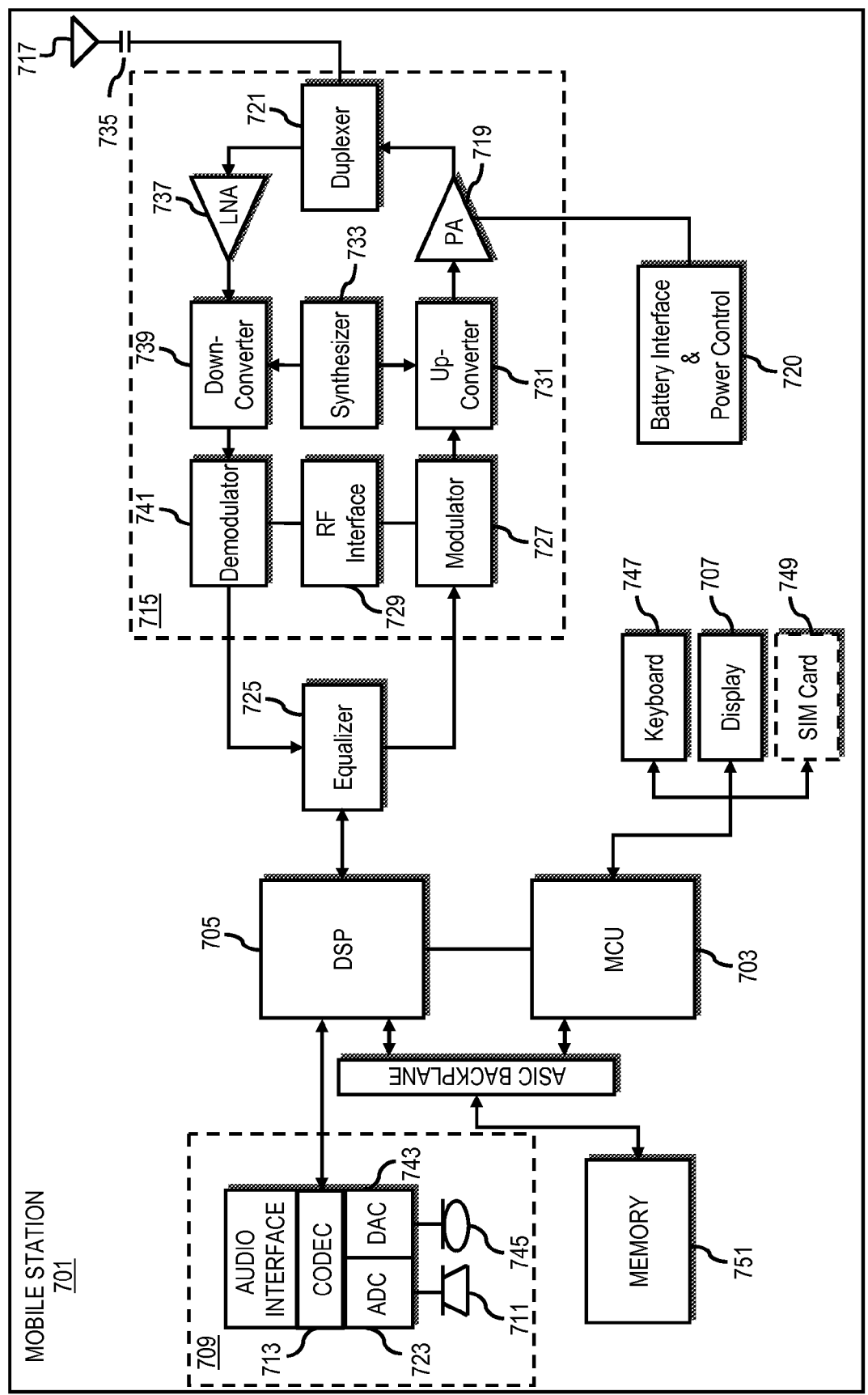
FIG. 7 is a diagram of a mobile terminal (e.g., handset) that can be used to implement an embodiment of the invention.

FIG. 7 is a diagram of exemplary components of a mobile terminal (e.g., handset) for communications, which is capable of operating in the system of FIG. 1, according to one embodiment. In some embodiments, mobile terminal 700, or a portion thereof, constitutes a means for performing one or more steps of presenting hierarchically categorically grouped points-of-interest. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application, the term "circuitry" would also cover an implementation of merely a processor (or multiple processors) and its (or their) accompanying software/or firmware. The term "circuitry" would also cover, for example, a base-band integrated circuit or applications processor integrated circuit in a mobile phone or a similar integrated circuit in a cellular network device or other network devices.

Pertinent internal components of the telephone include a Main Control Unit (MCU) 703, a Digital Signal Processor (DSP) 705, and a receiver/transmitter unit including a microphone gain control unit and a speaker gain control unit. A main display unit 707 provides a display to the user in support of various applications and mobile terminal functions that perform or support the steps of presenting hierarchically categorically grouped points-of-interest. The display unit 707 includes display circuitry configured to display at least a portion of a user interface of the mobile terminal (e.g., mobile telephone). Additionally, the display unit 707 and display circuitry are configured to facilitate user control of at least some functions of the mobile terminal. An audio function circuitry 709 includes a microphone 711 and microphone amplifier that amplifies the speech signal output from the microphone 711. The amplified speech signal output from the microphone 711 is fed to a coder/decoder (CODEC) 713.

A radio section 715 amplifies power and converts frequency in order to communicate with a base station, which is included in a mobile communication system, via antenna 717. The power amplifier (PA) 719 and the transmitter/modulation circuitry are operationally responsive to the MCU 703, with an output from the PA 719 coupled to the duplexer 721 or circulator or antenna switch, as known in the art. The PA 719 also couples to a battery interface and power control unit 720.

In use, a user of mobile terminal 701 speaks into the microphone 711 and his or her voice along with any detected background noise is converted into an analog voltage. The analog voltage is then converted into a digital signal through the Analog to Digital Converter (ADC) 723. The control unit 703 routes the digital signal into the DSP 705 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like.

The encoded signals are then routed to an equalizer 725 for compensation of any frequency-dependent impairments that occur during transmission though the air such as phase and amplitude distortion. After equalizing the bit stream, the modulator 727 combines the signal with a RF signal generated in the RF interface 729. The modulator 727 generates a sine wave by way of frequency or phase modulation. In order to prepare the signal for transmission, an up-converter 731 combines the sine wave output from the modulator 727 with another sine wave generated by a synthesizer 733 to achieve the desired frequency of transmission. The signal is then sent through a PA 719 to increase the signal to an appropriate power level. In practical systems, the PA 719 acts as a variable gain amplifier whose gain is controlled by the DSP 705 from information received from a network base station. The signal is then filtered within the duplexer 721 and optionally sent to an antenna coupler 735 to match impedances to provide maximum power transfer. Finally, the signal is transmitted via antenna 717 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile terminal 701 are received via antenna 717 and immediately amplified by a low noise amplifier (LNA) 737. A down-converter 739 lowers the carrier frequency while the demodulator 741 strips away the RF leaving only a digital bit stream. The signal then goes through the equalizer 725 and is processed by the DSP 705. A Digital to Analog Converter (DAC) 743 converts the signal and the resulting output is transmitted to the user through the speaker 745, all under control of a Main Control Unit (MCU) 703—which can be implemented as a Central Processing Unit (CPU) (not shown).

The MCU 703 receives various signals including input signals from the keyboard 747. The keyboard 747 and/or the MCU 703 in combination with other user input components (e.g., the microphone 711) comprise a user interface circuitry for managing user input. The MCU 703 runs a user interface software to facilitate user control of at least some functions of the mobile terminal 701 to present hierarchically categorically grouped points-of-interest. The MCU 703 also delivers a display command and a switch command to the display 707 and to the speech output switching controller, respectively. Further, the MCU 703 exchanges information with the DSP 705 and can access an optionally incorporated SIM card 749 and a memory 751. In addition, the MCU 703 executes various control functions required of the terminal. The DSP 705 may, depending upon the implementation, perform any of a variety of conventional digital processing functions on the voice signals. Additionally, DSP 705 determines the background noise level of the local environment from the signals detected by microphone 711 and sets the gain of microphone 711 to a level selected to compensate for the natural tendency of the user of the mobile terminal 701.

The CODEC 713 includes the ADC 723 and DAC 743. The memory 751 stores various data including call incoming tone data and is capable of storing other data including music data received via, e.g., the global Internet. The software module could reside in RAM memory, flash memory, registers, or any other form of writable storage medium known in the art. The memory device 751 may be, but not limited to, a single memory, CD, DVD, ROM, RAM, EEPROM, optical storage, or any other non-volatile storage medium capable of storing digital data.

An optionally incorporated SIM card 749 carries, for instance, important information, such as the cellular phone number, the carrier supplying service, subscription details, and security information. The SIM card 749 serves primarily to identify the mobile terminal 701 on a radio network. The card 749 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
    aggregating information about a plurality of points-of-interest;
    categorizing the plurality of points-of-interest into a first level grouping based on a first criterion and the aggregated information;
    categorizing the plurality of points-of-interest into a second level grouping based on a second criterion that is less restrictive than the first criterion and the aggregated information;
    assigning the first level grouping to a first scale level of a map; and
    assigning the second level grouping to a second scale level of the map.

2. A method of claim 1, comprising:
    querying an online database for additional information about the plurality of points-of-interest; and
    incorporating the additional information into the aggregated information for categorization of the plurality of points-of interest.

3. A method of claim 1, wherein the first level grouping and the second level grouping are predefined in the aggregated information.

4. A method of claim 1, wherein the first level grouping and the second level grouping are determined by performing a semantic analysis of the aggregated information.

5. A method of claim 1, further comprising:
    receiving a scale level input;
    determining a display scale level corresponding to the scale level input; and
    initiating display of the first level grouping or the second level grouping based on the determined display scale level.

6. A method of claim 5, further comprising:
    determining a display size of a mobile device, wherein the initiating of the display is further based on the display size.

7. A method of claim 5, further comprising:
    generating a first icon encompassing the points-of-interest of the first level grouping;
    generating a second icon encompassing the points-of-interest of the second level grouping; and
    initiating display of either the first icon or the second icon based on the determined display scale level.

8. A method of claim 1, further comprising:
    generating a request for the map and the plurality of points-of-interest; and
    initiating transmission of the request over a communication network.

9. An apparatus comprising:
    at least one processor; and
    at least one memory including computer program code,
    the at least one memory and the computer program code configured to, with the at least one processor, cause the apparatus to perform at least the following,
        aggregate information about a plurality of points-of-interest;
        categorize the plurality of points-of-interest into a first level grouping based on a first criterion and the aggregated information,
        categorize the plurality of points-of-interest into a second level grouping based on a second criterion that is less restrictive than the first criterion and the aggregated information,
        assign the first level grouping to a first scale level of a map, and
        assign the second level grouping to a second scale level of the map.

10. A apparatus of claim 9, wherein the apparatus is further caused to:
    query a online database for additional information about the plurality of points-of-interest; and
    incorporate the additional information into the aggregated information for categorization of the plurality of points-of interest.

11. An apparatus of claim 9, wherein the first level grouping and the second level grouping are predefined in the aggregated information.

12. An apparatus of claim 9, wherein the first level grouping and the second level grouping are determined by performing a semantic analysis of the aggregated information.

13. An apparatus of claim 9, wherein the apparatus is further caused to:
    receive a scale level input;
    determine a display scale level corresponding to the scale level input; and
    initiate display of the first level grouping or the second level grouping based on the determined display scale level.

14. An apparatus of claim 13, wherein the apparatus further includes a display and the apparatus is further caused to determine a display size of the display, wherein the initiating of the display is further based on the display size.

15. An apparatus of claim 13, wherein the apparatus is further caused to:
    generate a first icon encompassing the points-of-interest of the first level grouping;
    generate a second icon encompassing the points-of-interest of the second level grouping; and
    initiate display of either the first icon or the second icon based on the determined display scale level.

16. An apparatus of claim 9, wherein the apparatus is further caused to:
    generate a request for the map and the plurality of points-of-interest; and
    initiate transmission of the request over a communication network.

17. A computer-readable storage medium carrying one or more sequences of one or more instructions which, when executed by one or more processors, cause an apparatus to perform at least the following:
    aggregate information about a plurality of points-of-interest,
    categorize the plurality of points-of-interest into a first level grouping based on a first criterion and the aggregated information;
    categorize the plurality of points-of-interest into a second level grouping based on a second criterion that is less restrictive than the first criterion and the aggregated information;
    assign the first level grouping to a first scale level of a map; and
    assign the second level grouping to a second scale level of the map.

18. A computer-readable storage medium of claim 17, wherein the apparatus is further caused to:
    query a online database for additional information about the plurality of points-of-interest; and
    incorporate the additional information into the aggregated information for categorization of the plurality of points-of-interest.

19. An computer-readable storage medium of claim 17, wherein the first level grouping and the second level grouping are predefined in the aggregated information or determined by performing a semantic analysis of the aggregated information.

20. A computer-readable storage medium of claim 17, wherein the apparatus is further caused to:
    receive a scale level input;
    determine a display scale level corresponding to the scale level input;
    initiate display of the first level grouping or the second level grouping based on the determined display scale level;
    generate a first icon encompassing the points-of-interest of the first level grouping;
    generate a second icon encompassing the points-of-interest of the second level grouping; and
    initiate display of either the first icon or the second icon based on the determined display scale level.

* * * * *